A. D. Waymoth,
Machine for Turning Spools,
Nº 18,001. Patented Aug. 11, 1857.

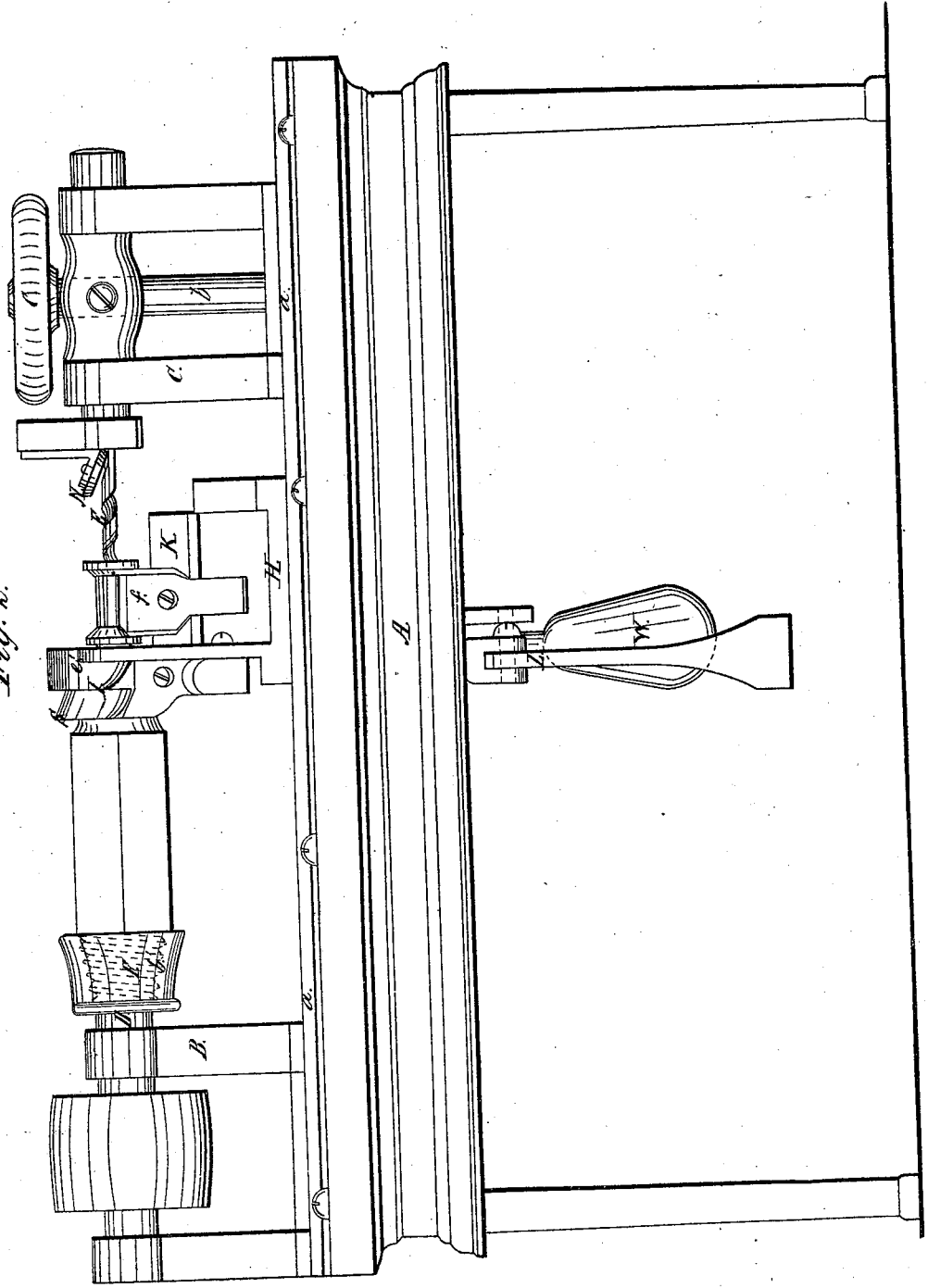

A. D. Waymoth,
Machine for Turning Spools,
Nº 18,001. Patented Aug. 11, 1857.
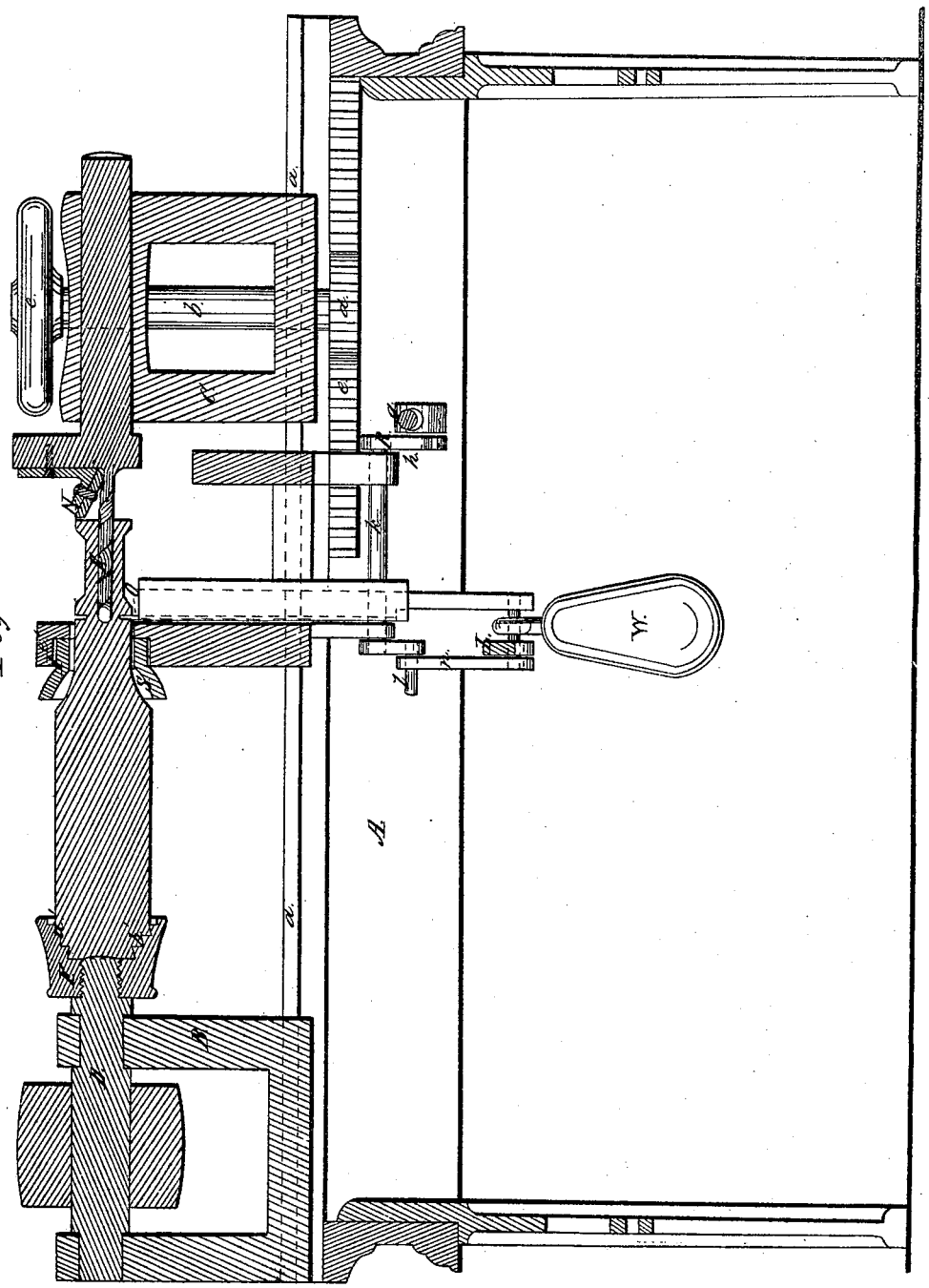

Sheet 4-4 Sheets

A. D. Waymoth,
Machine for Turning Spools,
N° 18,001. Patented Aug. 11, 1857.

UNITED STATES PATENT OFFICE.

A. D. WAYMOTH, OF FITCHBURG, MASSACHUSETTS, ASSIGNOR TO HIMSELF AND H. W. PAGE.

MACHINE FOR TURNING SPOOLS.

Specification of Letters Patent No. 18,001, dated August 11, 1857.

*To all whom it may concern:*

Be it known that I, AUGUSTINE D. WAYMOTH, of Fitchburg, in the county of Worcester and State of Massachusetts, have invented an Improved Machine for Making Spools or Bobbins; and I do hereby declare that the same is fully described and represented in the following specification and the accompanying drawings, of which—

Figure 1:
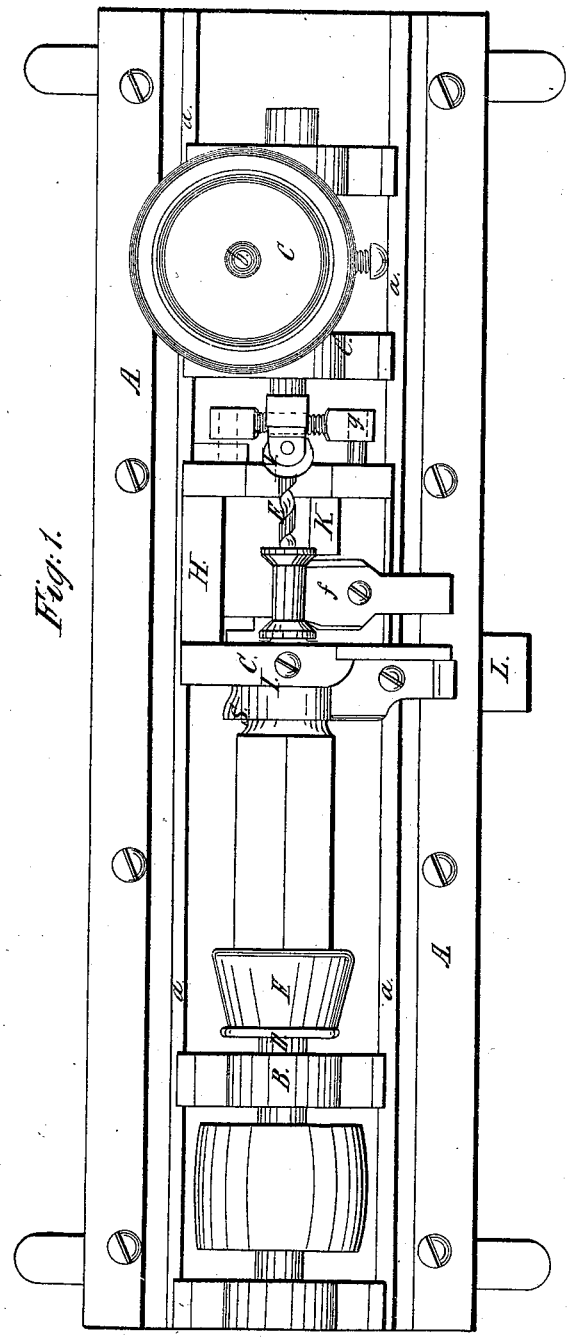
Figure 4:
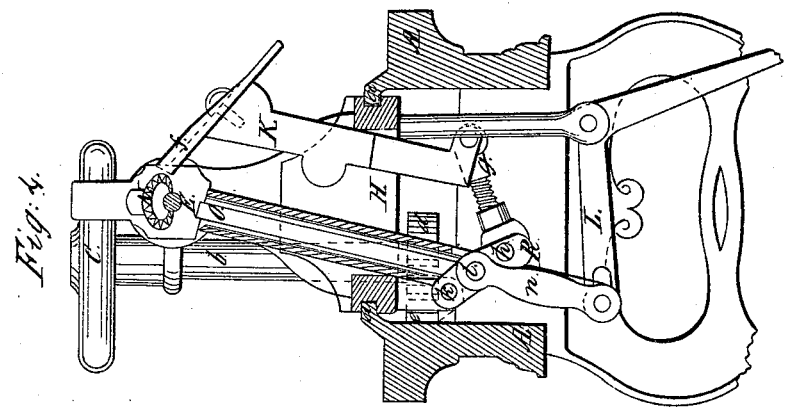

Figure 1, is a top view of the same. Fig. 2, a front elevation of it. Fig. 3, a central, vertical and longitudinal section of it. Fig. 4, a transverse section of it.

This machine in most of its general features is like that on which Letters Patent, numbered 15,446, were granted to me on the 15th day of July, A. D. 1856, that is, it has a frame, A, made similar to that of a common turning lathe or so as to support two puppet heads, B, C, the former of which, viz. B, carries a revolving mandrel, D, while the latter slides longitudinally toward and away from the other, and supports an auger or boring tool E, as seen in the drawings. The puppet head, B, is stationary or is fixed firmly to the frame A, while the boring carriage or puppet head, C, is made movable on its parallel ways, a, a, by power applied to a hand wheel, c, fixed on the upper end of a vertical shaft, b, such shaft carrying a pinion, d, working into a rack, e, arranged as shown in Fig. 3. On the inner end of the mandrel, D, a chuck, F, is screwed, the same being formed with a tapering or conical chamber, a', having a female screw, b', formed in it as shown in Fig. 3, such serving to receive and hold firmly the end of the stick of wood while the spools are being turned. By inserting the stick or bar of wood in the screw chamber of the chuck and pressing it therein toward the mandrel, while the said mandrel and chuck are in revolution the wood will become fixed to the screw by the action of the chuck.

Between the two puppet heads and applied to the ways, a, a, so as to be capable of sliding on them, is a tool carriage, H, supporting the socket head, I, of a rounding cutter, f, the same being arranged as shown in the drawings. This socket head is made trumpet shaped or with a flaring mouth, s, terminating in a tubular rest, e' the whole serving to guide and support the wood, while it is being turned or reduced by the action of the rounding or body cutter, f, affixed to a tool holder, K. This tool holder is a lever which is supported by the tool carriage and turns on a fulcrum so that the upper end of said tool holder may either approach toward or recede from the boring tool. To the lower arm of said tool holder, K, one end of a pitman, g, is jointed, its other end being made to turn on a crank pin, h, projecting from a wheel or disk, R, which is arranged and turns freely on a journal, k, projecting from the tool carriage H, (see Fig. 4). There is another crank pin, l, extended from said circular wheel or plate and arranged thereon as shown in Fig. 4. On this latter pin, another pitman, n, turns, the lower end of said pitman being jointed to the lesser arm of a weighted lever, L, applied to the frame and formed and arranged as shown in Figs. 2 and 4. The front or longer arm of the lever, L, extends downward so as to be in a convenient position to enable an attendant on the machine by pressing his knee against said arm so to move the lever as to cause the crank wheel to be turned on its journal in such manner as will so actuate the tool holder, K, as to cause the body cutter, f, to advance toward the piece of wood and reduce it, and next move backward out of the way. There is also jointed to the lesser arm of the lever, L, a severing cutter, o, the same being so arranged that when the longer arm of the lever, l, is moved inward such severing cutter shall be forced up against the stick of wood and so as to separate the bobbin or spool therefrom. By means of the mechanism for operating the body and severing cutters, the body cutter after performing its work of reducing the stick is moved entirely out of the way of it before the severing cutter is made to perform its operation, the whole being accomplished, during one movement of the lever, L, the said lever being moved backward by the gravitating power of its weight, W, suspended to it as shown in the drawings. By this mechanism the body and severing cutters are made to operate to much better advantage than when they are applied to a single cutter holder and arranged and operated as described in the specification of my patent herein before referred to.

The auger has attached to it a small rotating bur or milling wheel, N, the same being arranged as shown in Figs. 1, 2, and 3. It bears against the outer end of the stick of wood after the auger has entered the same and while the said stick is in revolution, the object of said wheel being to mill or imprint into the end of a spool, a suitable device, in reverse of the figure on the curved surface of the bur or milling wheel.

Figure 6:
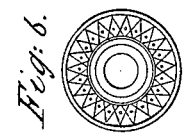
Figure 7:
Figure 5:
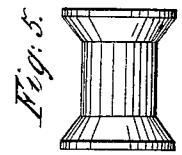

Fig. 5, represents the side of a spool as made by this machine, Fig. 6, being an end view and representing the manner in which it is milled. Fig. 7, is a side view of the milling wheel, the same being drawn on an enlarged scale.

Having thus described my invention I would remark, that I claim—

1. The combination of a stamping or milling wheel, with mechanism substantially as above described, for turning a spool from a piece of wood as explained, the said wheel being arranged so as to mill, engrave, or indent the end of a spool while said spool is being made or before it is separated from the stick as explained.

2. I also claim the combination of the two pitmen and the lever plate or wheel, or equivalent devices, with a lever for elevating the severing cutter, and that for carrying the body cutter, whereby the said body and severing cutters are made to operate in manner as specified, that is, during one single forward movement of the lever, L, connected with the severing cutter.

3. I also claim the tapering screw chuck constructed as specified.

In testimony whereof, I have hereunto set my signature.

AUGUSTINE D. WAYMOTH.

Witnesses:
R. H. EDDY,
F. P. HALE, Jr.